(12) United States Patent
Agetsuma et al.

(10) Patent No.: US 8,583,611 B2
(45) Date of Patent: Nov. 12, 2013

(54) FILE SERVER FOR MIGRATION OF FILE AND METHOD FOR MIGRATING FILE

(75) Inventors: Masakuni Agetsuma, Yokohama (JP); Etsutaro Akagawa, Kawasaki (JP); Yohsuke Ishii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 272 days.

(21) Appl. No.: 12/992,420

(22) PCT Filed: Oct. 22, 2010

(86) PCT No.: PCT/JP2010/006278
§ 371 (c)(1),
(2), (4) Date: Nov. 12, 2010

(87) PCT Pub. No.: WO2012/053040
PCT Pub. Date: Apr. 26, 2012

(65) Prior Publication Data
US 2012/0101995 A1  Apr. 26, 2012

(51) Int. Cl.
*G06F 7/00* (2006.01)
*G06F 17/30* (2006.01)
*G06F 17/00* (2006.01)

(52) U.S. Cl.
USPC ............ 707/694; 707/640; 707/783; 707/661

(58) Field of Classification Search
USPC ................................. 707/661, 640, 694, 783
See application file for complete search history.

(56) References Cited

U.S. PATENT DOCUMENTS

| | | | | |
|---|---|---|---|---|
| 6,542,930 | B1 * | 4/2003 | Auvenshine | 709/224 |
| 7,103,740 | B1 * | 9/2006 | Colgrove et al. | 711/162 |
| 7,171,532 | B2 * | 1/2007 | Kodama | 711/165 |
| 7,383,378 | B1 * | 6/2008 | Rajan et al. | 711/112 |
| 7,930,473 | B2 * | 4/2011 | Rajan et al. | 711/112 |
| 2002/0174306 | A1 * | 11/2002 | Gajjar et al. | 711/148 |
| 2007/0055715 | A1 | 3/2007 | Achiwa | |
| 2010/0095164 | A1 | 4/2010 | Kamei et al. | |

FOREIGN PATENT DOCUMENTS

| | | |
|---|---|---|
| JP | 2007-072813 | 3/2007 |
| JP | 2010-097359 | 4/2010 |

OTHER PUBLICATIONS

Brooks, Charlotte, et al.; IBM Tivoli Storage Management Concepts; ibm.com/redbooks; XP-002643949; May 2006 pp. i-xiii; 54-60, 171-196, 199-216.

PCT International Search Report on application No. PCT/JP2010/006278 dated Jul. 13, 2011; 11 pages.

* cited by examiner

*Primary Examiner* — Charles Lu
(74) *Attorney, Agent, or Firm* — Foley & Lardner LLP

(57) ABSTRACT

A file server stores the storage management information and migration policy information. The storage management information includes the information that indicates a storage attribute for each storage apparatus. The migration policy information includes a plurality of information sets. Each of the information sets includes the information that indicates a condition of a file attribute and the information that indicates a condition of a storage attribute of a storage apparatus that is a migration destination. The file server specifies a migration target file, specifies a storage apparatus that conforms to the storage attribute condition that is indicated by the information set that includes the information that indicates a condition of a file attribute that conforms to of a file attribute of a target file based on the storage management information, and migrates a target file from a storage apparatus that has stored the target file to the storage apparatus that has been specified.

4 Claims, 20 Drawing Sheets

| Path 801 | ACL 802 | Size (MB) 803 | Content type 804 | Last access time 805 | Last update time 806 |
|---|---|---|---|---|---|
| File1 | In-company (RW) | 5.0 | PDF | 2010-07-15 11:35:02 | 2009-12-22 18:40:35 |
| File2 | Executive (RW) | 2.5 | Word | 2010-07-15 23:01:33 | 2010-07-15 23:01:33 |
| File3 | Company member A (RW) | 1.0 | Word | 2010-07-22 10:31:01 | 2010-07-22 10:31:01 |
| File4 | In-company (RW) | 6.0 | Encrypted file | 2010-07-21 14:25:30 | 2010-01-15 16:20:00 |
| File5 | Accountant (RO) | 3.2 | Excel | 2010-07-22 15:00:32 | 2010-06-30 14:10:55 |
| ... | | | | | |

| ID 1001 | Storage name 1002 | I/O 1003 | Bit cost 1004 | Credibility 1005 | Storage country 1006 | Storage location 1007 | Connection method 1008 | Account 1009 | 505 |
|---|---|---|---|---|---|---|---|---|---|
| S1 | Local | High | High | High | — | /dev/disk0 | Direct | Unnecessary | |
| S2 | Private | Middle | Middle | High | A | URL1 | CIFS | user:passwd | |
| S3 | Public1 | Middle | Middle | Low | B | URL2 | HTTP | user:passwd | |
| S4 | Public2 | Middle | Middle | Low | B | URL3 | HTTP | user:passwd | |
| S5 | Public3 | Low | Low | Low | A | URL4 | HTTP | user:passwd | |

FIG.12

First filter management table  1410
1411  1412  1413  1414  1415

| Filter name | Layer | File attribute | Migration destination condition | Operation |
|---|---|---|---|---|
| F1-1 | 1 | No access for one month | I/O "Middle" | None |
| F1-2 | 1 | No access for six months | I/O "Low" | None |
| F1-3 | 1 | There is an access in one day | I/O "High" | None |
| F1-4 | 1 | There is an access in one day | I/O "Middle" | None |

Second filter management table  1420
1421  1422  1423  1424  1425

| Filter name | Layer | File attribute | Migration destination condition | Operation |
|---|---|---|---|---|
| F2-1 | 2 | ACL "Executive (RW)" | Credibility "High" | None |
| F2-2 | 2 | ACL "Accountant (RO)" | Credibility "High" | WORM |
| F2-3 | 2 | * | * | None |

Third filter management table  1430
1431  1432  1433  1434  1435

| Filter name | Layer | File attribute | Migration destination condition | Operation |
|---|---|---|---|---|
| F3-1 | 3 | * | Lowest bit cost | None |

FIG.14

```
if file.getACL.equal("Executive", RW) then
   condition.addAND("Credibility", HIGH);
   return condition;
elif file.getACL.equal("Accountant", RO) then
   condition.addAND("Credibility", HIGH);
   action.WORM(file);
   return condition;
else
   return condition;
endif
```

FIG.15

| | 1701 | 1702 | 1703 | 1704 | 1705 | 1700 |
|---|---|---|---|---|---|---|
| | ID | Migration source storage | File attribute | Migration destination storage | Operation | |
| | P1 | Credibility "Low" | * | * | Moving source shredding | |
| | P2 | * | * | Credibility "High" | Decryption | |
| | P3 | * | * | Credibility "Low" && Country "A" | Encryption | |
| | P4 | * | * | Credibility "Low" && Country "B" | Storing hash value | |

FIG.19

Trigger management table — 1200

| ID (1201) | Trigger (1202) | Migration source storage condition (1203) | Filter ID (1204) |
|---|---|---|---|
| E1 | ACL modification | I/O "High" | F1-1 |
| E2 | ACL modification | I/O "Middle" | F1-2 |

First filter management table — 1410

| ID | Layer | File attribute (1413) | Migration destination condition | Operation |
|---|---|---|---|---|
| F1-1 | 1 | No access for one month | I/O "Middle" | None |
| F1-2 | 1 | No access for six months | I/O "Low" | None |

Second filter management table — 1420

| ID | Layer | File attribute | Migration destination condition | Operation |
|---|---|---|---|---|
| F2-1 | 2 | ACL "Executive (RW)" | Credibility "High" | None |
| F2-2 | 2 | ACL "Accountant (RO)" | Credibility "High" | WORM |
| F2-3 | 2 | * | * | None |

Third filter management table — 1430

| ID | Layer | File attribute | Migration destination condition | Operation |
|---|---|---|---|---|
| F3-1 | 3 | * | Lowest bit unit cost | None |

FILE SERVER FOR MIGRATION OF FILE AND METHOD FOR MIGRATING FILE

TECHNICAL FIELD

The present invention relates to a migration of a file.

BACKGROUND ART

In accordance with a file migration in general, a file that has been stored into a first storage apparatus is migrated to a second storage apparatus. For instance, in accordance with Patent Literature 1 and Patent Literature 2, a migration of a file can be executed in such a manner that a storage cost of data is reduced while a convenience is maintained by storing a file that is provided with a high access frequency into a storage apparatus with a high cost and a high speed and by storing a file that is provided with a low access frequency into a storage apparatus with a low cost and a low speed.

CITATION LIST

Patent Literature

[PTL 1]
Japanese Patent Application Laid-Open Publication No. 2007-072813
[PTL 2]
Japanese Patent Application Laid-Open Publication No. 2010-097359

SUMMARY OF INVENTION

Technical Problem

In a conventional file migration, a storage apparatus of a migration destination has been decided by simply using an access frequency of a file and a performance of a storage apparatus as indexes and a migration of a file has been executed. However, it is necessary to execute a migration of a file while taking account of not only indexes of an access frequency of a file and a performance of a storage apparatus but also other indexes such as the access control information of a file and a credibility of storage in a composite environment of the storage apparatuses that are provided with different attributes such as a storage apparatus that is provided with a high credibility and a storage apparatus that is provided with a low credibility.

In recent years for instance, a cloud storage that provides a function of storage to an unspecified large number of users via a network has been utilized as a storage location of data. The cloud storage can be classified broadly into a public cloud storage and a private cloud storage. The public cloud storage is a storage apparatus that is operated or managed by an organization that is different from a user, and is accessed by an unspecified large number of users via the Internet in general. On the other hand, the private cloud storage is a storage apparatus that is operated or managed by an organization that is same as a user. Unlike the public cloud storage, a user for the private cloud storage can be limited to a person in the same organization and an access can be limited to an access via a network in an organization such as the WAN (Wide Area Network) and the LAN (Local Area Network).

The public cloud storage is operated or managed by an organization that is different from a user, and is utilized by an unspecified large number of users via the Internet. Consequently, the public cloud storage is provided with a high risk such as a leak of information and a falsification of information, and is provided with a low credibility unfortunately.

On the other hand, the private cloud storage is operated or managed by an organization that is same as a user, and an access of the private cloud storage is limited to an access via an internal network of a user such as the WAN and the LAN. Consequently, the private cloud storage is provided with credibility higher than that of the public cloud storage.

In the case in which the public cloud storage and the private cloud storage are used together with each other as a migration destination, it is thought that data that is provided with a low access frequency is stored into the public cloud storage of a low speed and data that is provided with a high access frequency is stored into the private cloud storage of a high speed that is utilized via the LAN or the WAN.

However, it is not necessarily the case that a file that is provided with a low access frequency is a file that is provided with a low importance. A file that has stored the confidential information and that is provided with a high importance is at risk of being stored into the public cloud storage that is provided with a low credibility.

The above problem may also occur for a storage attribute other than credibility.

An object of the present invention is to provide a manner that a storage apparatus that is suitable as a migration destination of a file can be selected from a plurality of storage apparatuses that are provided with different storage attributes.

Solution to Problem

A file server is comprised of a communication interface device that is coupled to a client computer and a plurality of storage apparatuses of which attribute are different, a storage resource that stores the storage management information and migration policy information, and a processor that is coupled to the communication interface device and the storage resource.

The communication interface device can include a first communication interface device to which at least one storage apparatus of the plurality of storage apparatuses is coupled and a second communication interface device to which at least one another storage apparatus of a client computer and the plurality of storage apparatuses is coupled.

The storage management information includes the information that indicates a storage attribute for each storage apparatus.

The migration policy information includes a plurality of information sets.

Each of the information sets includes the information that indicates a condition of a file attribute and the information that indicates a condition of a storage attribute of a storage apparatus that is a migration destination.

The processor executes the following steps:
(a) specifying a target file of a migration;
(b) specifying a storage apparatus that conforms to the storage attribute condition that is indicated by the information set that includes the information that indicates a condition of a file attribute that conforms to of a file attribute of a target file, based on the storage management information; and
(c) migrating a target file from a storage apparatus that has stored the target file to the storage apparatus that has been specified in the above (b).

BRIEF DESCRIPTION OF DRAWINGS

FIG. 8 shows a configuration of a storage management table 505.

FIG. 12 shows a configuration of a plurality of filter management tables.

FIG. 14 shows an example of a text input screen that is configured to specify a filter.

FIG. 15 shows a configuration of a migration post-processing management table 1700.

FIG. 19 shows a configuration of a trigger management table in which a trigger is an ACL modification.

DESCRIPTION OF EMBODIMENTS

A mode for an embodiment in accordance with the present invention will be described below in detail with reference to the drawings. In the following descriptions, while a wide variety of information will be described in the expression of "xxx table" in some cases, a wide variety of information can be represented by a data structure other than a table. In order to indicate that a data structure is not depended on, "xxx table" can also be referred to as "xxx information".

In the following descriptions, while an ID (identifier) is used for specifying an element, a name or a number can also be used as an ID.

A management system can also be at least one computer. More specifically, in the case in which a management computer indicates the information or a management computer transmits the information for an indication to a remote computer, the management computer is a management system. Moreover, in the case in which a function equivalent to a management computer is implemented by using a plurality of computers for instance, the plurality of computers is a management system (the plurality of computers can include a computer for an indication in the case in which a computer for an indication executes an indication). In the present embodiment, the management computer is a management system.

In the following descriptions, the processing will be described while a "program" is a subject in some cases. In the case in which the program is executed by a processor (for instance, a CPU (Central Processing Unit)), the processor executes the predetermined processing by using a storage resource (such as a memory) and/or a communication interface device (such as a communication port) as it decides proper. Consequently, a subject of a processing can also be a processor. The processing that is described while a program is a subject can also be a processing that is executed by a computer (such as a file server, a management computer, and a client). Moreover, the processing can include a hardware circuit that executes a part or a whole of a processing that is executed by a processor. A computer program can be installed from a program source to each of the computers. The program source can be a program distribution server (such as a management computer) or a storage medium for instance.

Figure 1:
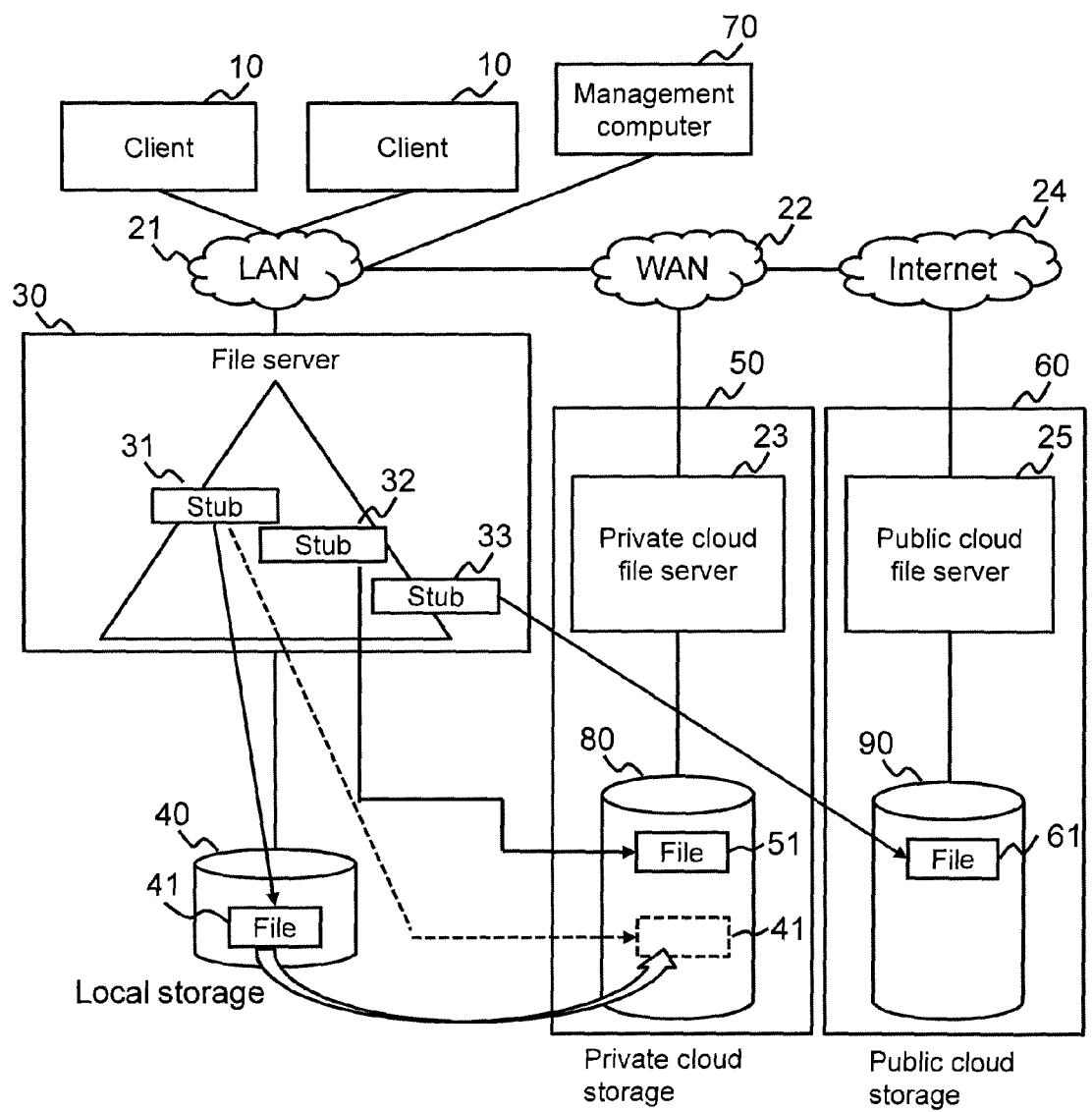
FIG. 1 shows a configuration of a computer system in accordance with an embodiment of the present invention.

FIG. 1 shows a configuration of a computer system in accordance with an embodiment of the present invention.

A computer system is provided with a file server 30, a local storage 40, a private cloud storage 50, a public cloud storage 60, and a management computer 70.

A plurality of (or one) client computers (hereafter referred to as a client) 10 and the management computer 70 are coupled to the file server 30 via a LAN 21.

The file server 30, the private cloud storage 50, and the public cloud storage 60 are coupled to each other via one or a plurality of communication networks. In the example shown in FIG. 1, the file server 30 and the private cloud storage 50 are coupled to each other via a LAN 21 and a WAN 22, and the file server 30 and the public cloud storage 60 are coupled to each other via a LAN 21, a WAN 22, and an Internet 24. At least one of the LAN 21, the WAN 22, and the Internet 24 can also be another kind of a communication network.

The local storage 40 is coupled to the file server 30. The private cloud storage 50 is configured by the private cloud file server 23 and the local storage 80, and the public cloud storage 60 is configured by the public cloud file server 25 and the local storage 90. In the case in which a read/write occurs from the file server 30 to the private cloud storage 50, the private cloud file server 23 executes a read/write of a file that has been stored into the local disk 80, and returns a result to the file server 30. Similarly, in the case in which a read/write occurs from the file server 30 to the public cloud storage 60, the public cloud file server 25 executes a read/write of a file that has been stored into the local disk 90, and returns a result to the file server 30. The file server 30 can include an embedded local storage 40. Similarly, the private cloud file server 23 can include an embedded local storage 80, and the public cloud file server 25 can include an embedded local storage 90.

The "local storage" is a storage apparatus that is coupled to the file server 30, the private cloud file server 23, and the public cloud file server 25. The "private cloud storage" is a cloud storage that is operated or managed by an organization that is same as a user, and is accessed by a user in the organization via mainly an internal network of a user such as the WAN (Wide Area Network) and the LAN (Local Area Network). The "public cloud storage" is a cloud storage that is operated or managed by an organization that is different from a user, and is mainly accessed by an unspecified large number of users via the Internet. In FIG. 1, the local storage 40 is a storage apparatus that is coupled to the file server 30 not via the LAN 21 (but via a dedicated line through which a communication is executed based on an FC protocol, a SAN (Storage Area Network), or the Ethernet (registered trademark)). The private cloud storage 50 is a storage apparatus that is coupled to the file server 30 via the WAN 22 (and the LAN 21). The public cloud storage 60 is a storage apparatus that is coupled to the file server 30 via the Internet 24 (and the LAN 21 and the WAN 22).

Figure 2:
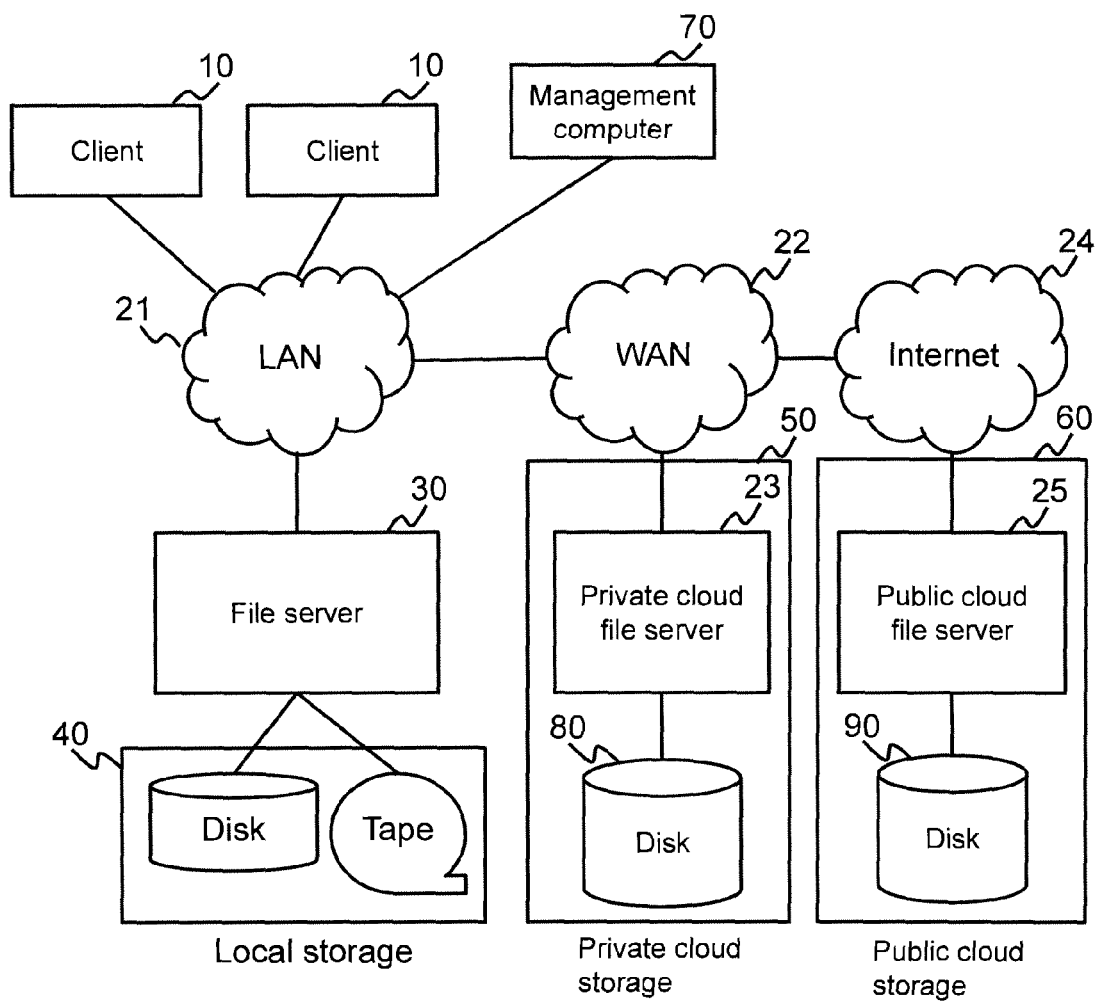
FIG. 2 shows an example of a concept of FIG. 1 as a hardware configuration drawing.

Each of the local storages 40, 80, and 90 is a block storage apparatus. The block storage apparatus can be an apparatus that is provided with a plurality of physical storage devices and with a RAID (Redundant Array of Independent (or Inexpensive) Disks) function, or can be a single physical storage device. FIG. 2 shows an example of a concept of FIG. 1 as a hardware configuration drawing. In the example shown in FIG. 2, the local storage 40 is provided with a physical storage device of a disk type (hereafter referred to as a disk) (such as an HDD (Hard Disk Drive)) and a physical storage device of a tape type (hereafter referred to as a tape) as a physical storage device. The local storages 80 and 90 are provided with a disk as a physical storage device. The type of a physical storage device that is included in the local storages 40, 80, and 90 is not restricted to a disk and a tape. For instance, a flash memory device (such as an SSD (Solid State Drive)) can also be adopted as a physical storage device.

The file server 30 is provided with a file system that is configured to manage at least one file that is stored in the local storage 40 (hereafter referred to as a first local file system). The private cloud file server 23 is provided with a file system that is configured to manage at least one file that is stored in the local storage 80 (hereafter referred to as a second local file system). The public cloud file server 25 is provided with a file system that is configured to manage at least one file that is stored in the local storage 90 (hereafter referred to as a third local file system).

The file server 30 is provided with a hierarchical file system. The hierarchical file system is a file system that is provided with a function for transparently accessing files that have been stored into a plurality of storage apparatuses in a dispersed manner. A file on the hierarchical file system is a special file that stores an actual location of the file (a storage apparatus of a storage destination and a path on a file system) as substitute for the data of a file (an entity). The special file is called a "stub file" (hereafter referred to as a stub). In the following, a status in which a stub stores a location of a file is represented as a status in which a stub is linked to a file. In the example shown in FIG. 1, a file has been stored into any one of the storage 40 (a first local file system), the storage 50 (a second local file system), and the storage 60 (a third local file system). A stub 31 is linked to a file 41, and the file 41 is stored in the local storage 40. Moreover, a stub 32 is linked to a file 51, and the file 51 is stored in the private cloud storage 50. Furthermore, a stub 33 is linked to a file 61, and the file 61 is stored in the public cloud storage 60.

A file on a hierarchical file system is provided to a client 10 by the file server 30. Consequently, in the case in which the client 10 accesses a desired stub in the hierarchical file system, the client 10 can access a file that is associated with the stub. In other words, the client 10 can access a file without being conscious of a file and a storage apparatus that stores the file. More specifically, in the case in which a file server 30 receives a read command that specifies a stub 32 from the client 10 via the LAN 21 for instance, the file server 30 reads a file 51 of a link destination of the stub 32 from the private cloud storage 50 via the LAN 21 and the WAN 22, and the file server 30 provides the read file 51 to the client 10 via the LAN 21.

The file server 30 checks an attribute of the files 41, 51, and 61 and/or an access frequency of the files 41, 51, and 61. The file server 30 can execute a file migration (hereafter referred to as a migration) based on the result of the check. More specifically, the file server 30 executes the following processing for instance:

(a1) The file server 30 decides a file of a migration target based on the result of the check of an attribute of the files 41, 51, and 61 and/or an access frequency of the files 41, 51, and 61 (for instance, a file 41 in a local storage 40 is decided as a file of a migration target);

(a2) The file server 30 decides a storage apparatus that is a migration destination based on an attribute of the files 41 (a file of a migration target) (for instance, the private cloud storage 50 is decided as a storage apparatus of a migration destination);

(a3) The file server 30 reads a file 41 from a local storage 40, and transmits the file 41 to the private cloud file server 23 in the private cloud storage 50 via the LAN 21 and the WAN 22 (the private cloud file server 23 stores the file 41 into the private cloud storage 50); and (a4) The file server 30 modifies a link destination of a stub 31 from the file 41 in the local storage 40 to the file 41 in the private cloud storage 50 (in other words, the file server 30 stores the information that indicates a location in the private cloud storage 50 as the link destination information into the stub 31).

After the migration, in the case in which the file server 30 receives an access command that specifies the stub 31 from the client 10, the file server 30 accesses the file 41 in the private cloud storage 50 via the LAN 21, the WAN 22, and the private cloud file server 23.

In the present embodiment, the credibility of the private cloud storage 50 and the credibility of the local storage 40 are equivalent to each other in essence, and a bit cost (a cost per bit) of the private cloud storage 50 is lower than a bit cost of the local storage 40. Consequently, for a migration in accordance with the above example, since the file 41 is migrated from the local storage 40 to the private cloud storage 50, the file 41 is migrated to a storage apparatus that is provided with a low bit cost while the credibility is kept in essence.

The access control information can be mentioned for instance as an attribute of a file. The access control information is the information related to a restriction of an access to a file that is corresponded to the information. The access control information includes the information that indicates an access authority that a user of the client 10 has and a type of an access permitted (for instance, both of a read and a write is enabled, only read is enabled, or both of a read and a write is inhibited). The access control information is an ACL (Access Control List) for instance.

For the present embodiment, a plurality of storage apparatuses that is provided with different credibility includes the private cloud storage 50 and the public cloud storage 60. The file server 30 selects a storage apparatus that is suitable for an importance of the file among the private cloud storage 50 and the public cloud storage 60 based on an attribute of a file (for instance, the access control information) as a migration destination of a file in the local storage. More specifically, a file that is provided with a high importance is migrated to the private cloud storage 50, and a file that is provided with a low importance is migrated to the public cloud storage 60. In the present embodiment, the file can be stored into a storage apparatus that is suitable for an importance of the file.

A mode for the present invention will be described below in detail.

Figure 3:
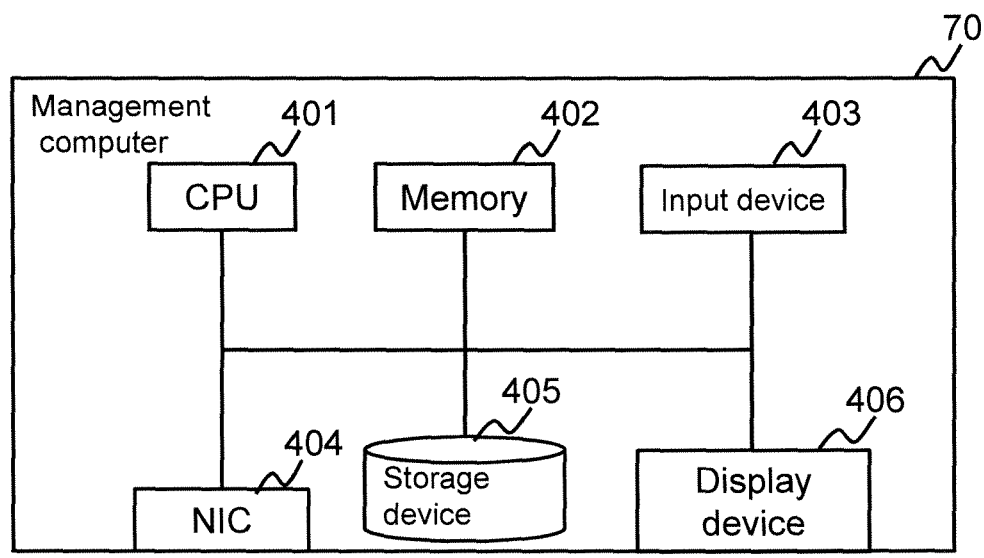
FIG. 3 shows a configuration of a management computer 70.

FIG. 3 shows a configuration of a management computer 70.

The management computer 70 is provided with a memory 402, an input device 403, a NIC (Network Interface Card)

404, a storage device 405, a display device 406, and a CPU (Central Processing Unit) 401 that is coupled to the memory and devices. A storage resource of another type can also be adopted as substitute for at least one of the memory 402 and the storage device 405. A communication interface device of another type can also be adopted as substitute for the NIC 404.

A computer program is loaded from the storage device 405 to the memory 402. The CPU 401 executes a computer program that has been stored into the memory 402. The input device 403 is a device that is operated by a manager, and is a keyboard or a pointing device for instance. The NIC 404 is coupled to the LAN 21. The storage device 405 is an HDD for instance. The display device 406 is a liquid crystal display for instance.

The management computer 70 can configure the information in the file server 30 in accordance with an operation of a manager. The information that is configured in the file server 30 is a migration policy management table which is described later for instance.

Figure 4:
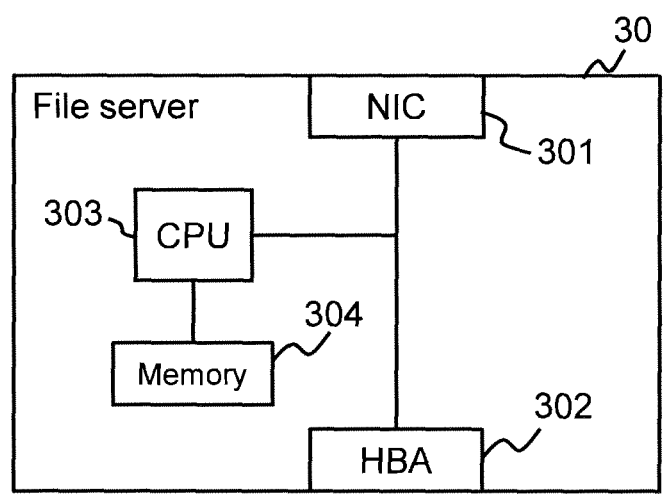
FIG. 4 shows a configuration of a file server 30.

FIG. 4 shows a configuration of a file server 30.

The file server 30 is provided with a NIC 301, an HBA (Host Bus Adaptor) 302, a memory 304, and a CPU 303 that is coupled to the devices. A storage resource of another type can also be adopted as substitute for or in addition to the memory 304. A communication interface device of another type can also be adopted as substitute for the NIC 301 and the HBA 302.

The NIC 301 is coupled to the LAN 21. The HBA 302 is coupled to the local storage 40 via a dedicated line or a SAN (Storage Area Network). The memory 304 stores a computer program and information. The memory 304 can also include a cache area that stores a file that is received from the client 10 and a file that is transmitted to the client 10 on a temporary basis. The CPU 303 executes the computer program that has been stored into the memory 304.

Figure 5:
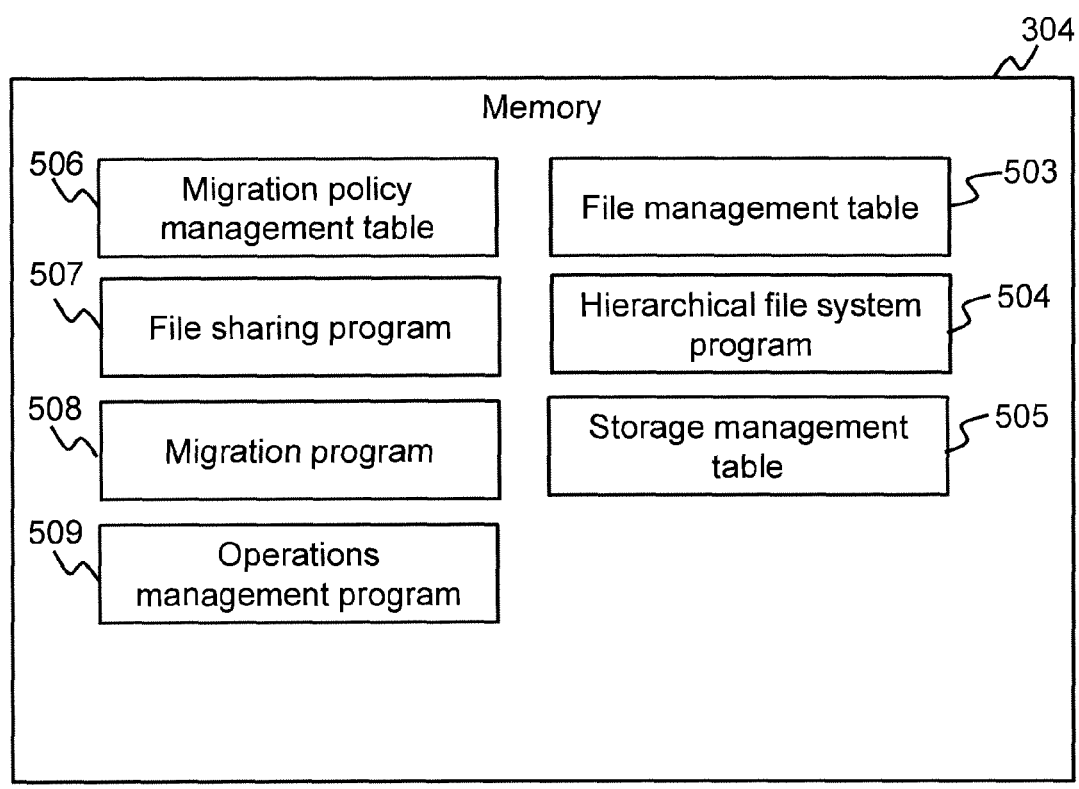
FIG. 5 shows a computer program and the information that are stored in a memory 304 of a file server 30.

FIG. 5 shows a computer program and the information that are stored in the memory 304 of the file server 30.

The memory 304 stores a file management table 503, a hierarchical file system program 504, a storage management table 505, a migration policy management table 506, a file sharing program 507, a migration program 508, and an operations management program 509.

The file management table 503 is provided with the information that indicates an attribute related to each of the files.

The hierarchical file system program 504 provides a hierarchical file system.

The storage management table 505 is provided with the information related to each of the storage apparatuses.

The migration policy management table 506 is provided with the information related to a policy of a migration.

The file sharing program 507 provides a file sharing service to a client by using a communication protocol (an NFS (Network File System)/a CIFS (Common Internet File System)/an FTP (File Transfer Protocol)/an HTTP (HyperText Transfer Protocol)) or the like. A file that is provided for the file sharing service is a stub on the hierarchical file system that is provided by the hierarchical file system program 504.

The migration program 508 decides a file that is a target of a migration and a storage apparatus of a storage destination of the file based on the file management table 503 and the migration policy management table 506, and migrates the decided file to the decided storage apparatus.

The operations management program 509 controls an operation of the file server 30. For instance, the operations management program 509 provides a GUI (Graphical User Interface), which is described later, to the management computer 70.

Figure 6:
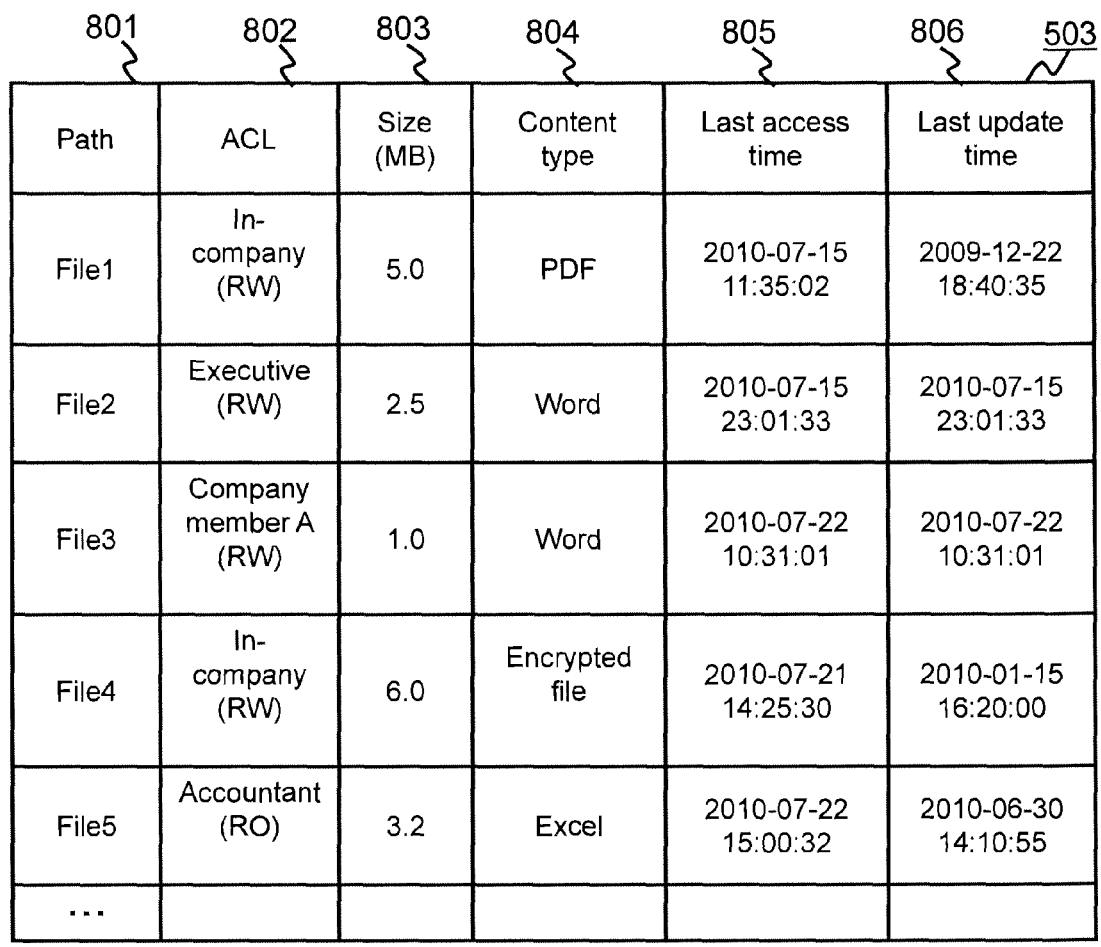
FIG. 6 shows a configuration of a file management table 503.

FIG. 6 shows a configuration of the file management table 503.

The file management table 503 is provided with the information of a path 801, an ACL (Access Control List) 802, a size 803, a content type 804, a last access time 805, and a last update time 806 for each file.

The path 801 indicates a path to a file.

The ACL 802 is provided with the information related to an access control of a file. For instance, the ACL 802 indicates a group in which an access from a client 10 of a user who belongs to the group is permitted and/or a type of an access permitted (for instance, RW (both of a read and a write is enabled) and RO (only read is enabled).

The size 803 indicates a size of a file.

The content type 804 indicates a type of a file (for instance, a PDF file, a Word file, and an encrypted file).

The last access time 805 indicates a latest time when a file is accessed. Although a time is represented by a year, a month, a day, an hour, a minute, and a second in the present embodiment, a unit of a time is not restricted to the above. The last access time 805 can be updated in the case in which an access is a write as well as in the case in which an access is a read.

The last update time 806 indicates a latest time when a file is updated. The last update time 806 is not updated in the case in which an access is a read, but is updated in the case in which an access is a write.

In FIG. 6, it is found that the final update of a file of File2 is executed by an executive at 23:01:33 of 2010-07-15 since the file of File2 is a Word file of 2.5 MB and the last access time 805 and the last update time 806 are equivalent to each other.

The ACL 802 can also be managed in the memory 304 of the file server 30 separately from the file management table 503. Moreover, the file management table 503 can also include the information related to a directory. A migration can also be executed not only in a unit of a file but also in a unit of a directory.

Figure 7:
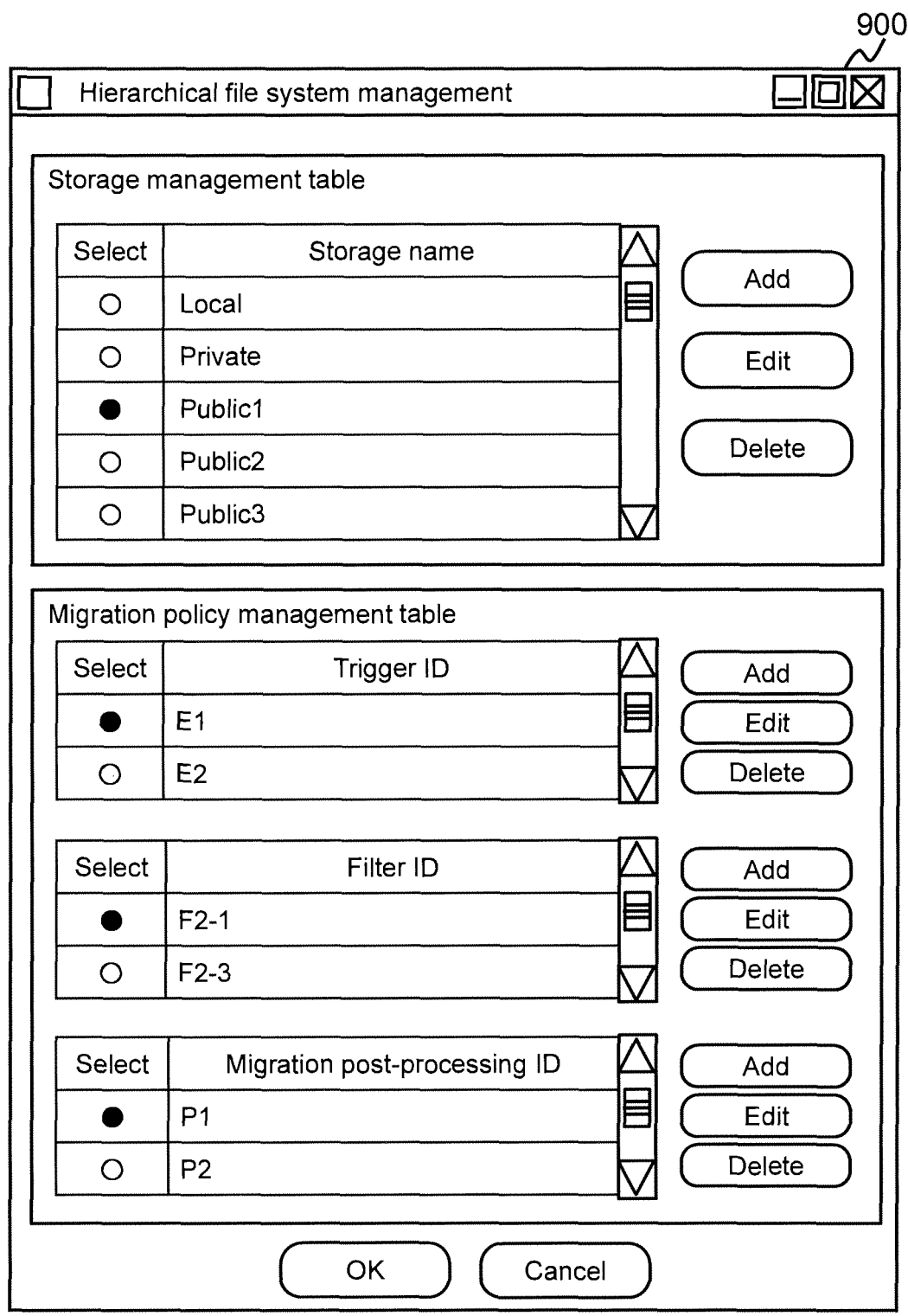
FIG. 7 shows a GUI (Graphical User Interface) 900.

FIG. 7 shows a GUI (Graphical User Interface) 900 that is provided by the operations management program 509.

The GUI (Graphical User Interface) 900 is provided to the management computer 70 and is indicated by the display device 406 (see FIG. 3). A manager can specify the storage management table 505 and the migration policy management table 506.

FIG. 8 shows a configuration of the storage management table 505.

The storage management table 505 is provided with the information of an ID (IDentifier) 1001, a storage name 1002, an I/O performance 1003, a bit cost 1004, credibility 1005, a storage country 1006, a storage location 1007, a connection method 1008, and an account 1009 for each storage apparatus.

The ID 1001 is an identifier of a storage apparatus.

The storage name 1002 is a name of a storage apparatus. The storage name "Local" represents a local storage, the storage name "Private" represents a private cloud storage, and the storage name "Public" represents a public cloud storage. In FIG. 8, it is found that there are one local storage apparatus, one private cloud storage apparatus, and three public cloud storage apparatuses.

The I/O performance 1003 indicates an I/O performance of a storage apparatus. For instance, "High" represents that an I/O performance is high, and "Low" represents that an I/O performance is low. The I/O performance 1003 is indicated by three stages composed of "High", "Middle", and "Low". However, the I/O performance 1003 can also be indicated by an expression of another type (for instance, a numerical value of a response time).

The bit cost 1004 indicates a unit cost per bit for a storage apparatus. For instance, "High" represents that a bit cost is high, and "Low" represents that a bit cost is low. The bit cost 1004 is indicated by three stages composed of "High", "Middle", and "Low". However, the bit cost 1004 can also be indicated by an expression of another type (for instance, a numerical value).

The credibility 1005 indicates a degree of a difficulty for a leak of information and a falsification of information (a level of credibility). For instance, "High" represents that the credibility is high, and "Low" represents that the credibility is low. The credibility 1005 is indicated by three stages composed of "High", "Middle", and "Low". However, the credibility 1005 can also be indicated by an expression of another type (for instance, a numerical value).

The storage country 1006 indicates a country in which a storage apparatus is disposed. For instance, "A" represents that a storage apparatus is disposed in a country A, and "B" represents that a storage apparatus is disposed in a country B.

The storage location 1007 indicates an address for accessing a storage apparatus. For instance, the storage location 1007 is a path in the case of a local storage, and the storage location 1007 is URI (Uniform Resource Identifier) in the case of a private cloud storage and a public cloud storage.

The connection method 1008 indicates a method of a connection between a storage apparatus and a file server 30. For instance, "Direct" represents that a storage apparatus and the file server 30 execute a data communication with a block storage by using a protocol such as an SCSI, "CIFS" represents that a storage apparatus and the file server 30 execute a data communication by using a CIFS, and "HTTP" represents that a storage apparatus and the file server 30 execute a data communication by using an HTTP.

The account 1009 indicates the account information (such as an ID or a password) that is required for an access to a storage apparatus.

Moreover, the storage management table 505 can also be provided with the information that indicates a free capacity of a storage apparatus, a communication cost from the file server 30 to the storage apparatus (for instance, a rate for a unit data size), and a communication delay time as substitute for or in addition to at least one of the above described information of a plurality of types for each storage apparatus.

Figure 9:
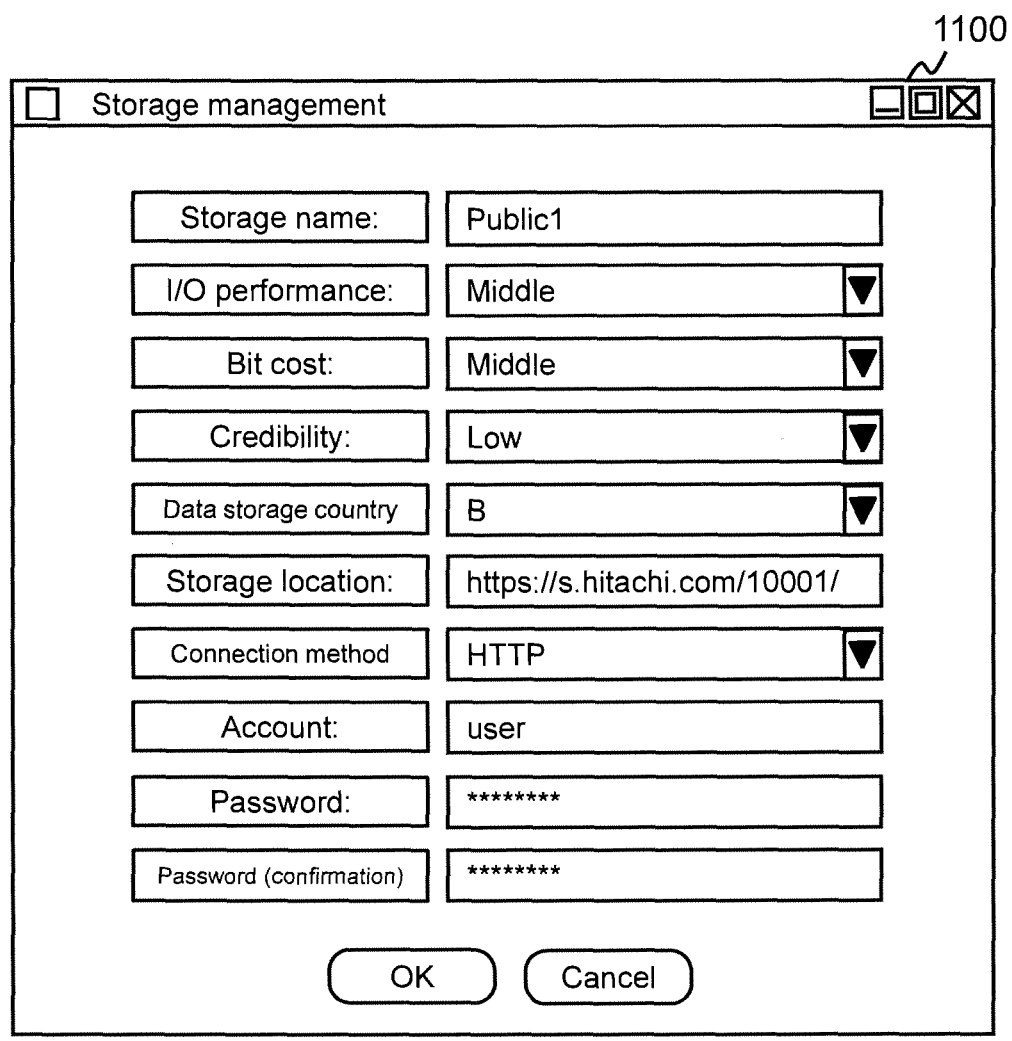
FIG. 9 shows a GUI 1100 that is indicated in the case in which a storage name "Public1" is selected and the "Edit" button is pressed in the GUI shown in FIG. 7.

The information that is registered to the storage management table 505 is the information that is input by a manager via the GUI 1100 shown in FIG. 9 and that is received from the management computer 70 for instance. The GUI 1100 shown in FIG. 9 is a GUI that is displayed in the case in which a storage name "Public1" is selected in the GUI 900 shown in FIG. 7 and the "Edit" button is pressed for instance. The manager can input the information related to a storage apparatus that is provided with a storage name "Public1" via the GUI 1100, and the input information is registered to the storage management table 505.

The migration policy management table 506 will be described in the following. As found in the GUI 900 shown in FIG. 7, the migration policy management table 506 is composed of a trigger ID (a trigger management table 1200: see FIG. 10), a filter ID (the filter management tables 1410 to 1430: see FIG. 12), and a migration post-processing ID (a migration post-processing management table 1700: see FIG. 15). The table of each type will be described in the following.

Figure 10:
FIG. 10 shows a configuration of a trigger management table 1200.

FIG. 10 shows a configuration of the trigger management table 1200.

The trigger management table 1200 is provided with an ID 1201, a trigger 1202, a migration storage source condition 1203, and a filter ID 1204 for each trigger.

The ID 1201 is an ID of a trigger.

The trigger 1202 indicates a trigger for executing a migration processing (a subroutine processing of a migration program 508). In the FIG. 10, the information that indicates a periodic execution start time of a migration processing is registered as the trigger 1202. However, the information of the other types such as the information that indicates that (1) an ACL has been modified (see FIG. 19 for instance) and (2) a free ratio of a storage apparatus (a ratio of a free capacity of a storage apparatus to a capacity of a storage apparatus) has exceeded a predetermined ratio can also be registered as the trigger 1202 as substitute for the information that indicates an execution start time.

The migration storage source condition 1203 indicates a condition of a storage apparatus that is a migration source. In the example shown in the figure, the information that indicates a condition related to an I/O performance is registered as the migration storage source condition 1203. However, the information related to an attribute of the other types of a storage apparatus such as the information that indicates a bit cost, credibility, and a storage country can also be adopted.

The filter ID 1204 is an ID of a filter (information) for choosing a file of a migration target and a storage apparatus of a migration destination. The filter is stored into a storage resource (such as a memory 304).

In the FIG. 10, the migration storage source condition 1203 is a condition related to an I/O performance of a storage apparatus, and a file attribute 1413 that is described in a filter (a first filter, see FIG. 12) that is specified by the filter ID 1204 is a condition related to an access frequency. In other words, it is expected that a file that suits a file attribute 1413 that is indicated by a first filter is extracted as a migration candidate from a storage apparatus that suits an I/O performance condition that is indicated by the migration storage source condition 1203.

Figure 11:
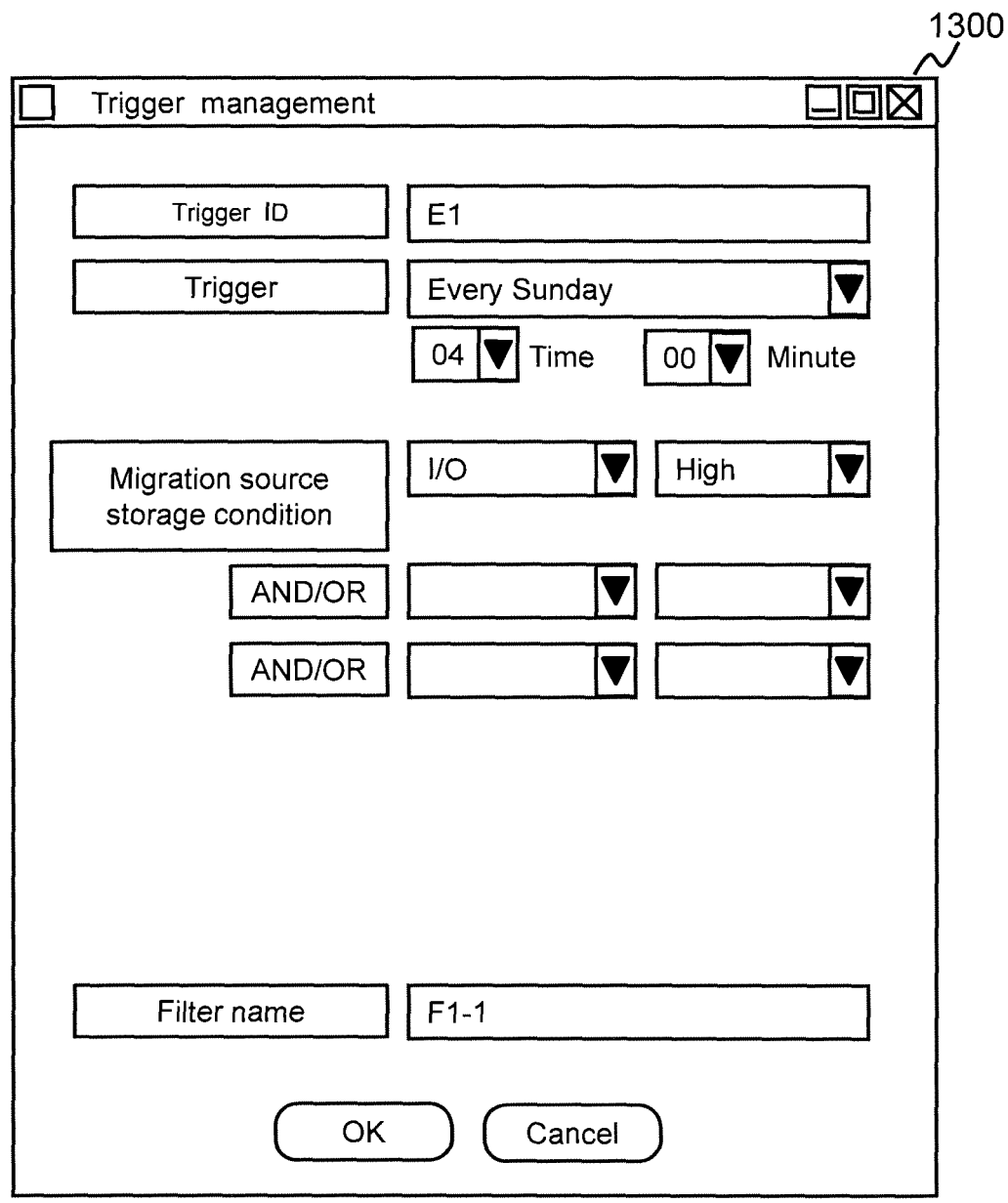
FIG. 11 shows a GUI 1300 that is indicated in the case in which a trigger ID "E1" is selected and the "Edit" button is pressed in the GUI shown in FIG. 7.

The information that is registered to the trigger management table 1200 is the information that is input by a manager via the GUI 1300 shown in FIG. 11 and that is received from the management computer 70 for instance. The GUI 1300 shown in FIG. 11 is a GUI that is displayed in the case in which a trigger ID "E1" is selected in the GUI 900 shown in FIG. 7 and the "Edit" button is pressed for instance. The manager can input the information related to a trigger of the trigger ID "E1" via the GUI 1300, and the input information is registered to the trigger management table 1200.

FIG. 12 shows a configuration of a plurality of filter management tables.

The plurality of filter management tables is composed of a first filter management table 1410, a second filter management table 1420, and a third filter management table 1430 for instance. The first filter management table 1410, the second filter management table 1420, and the third filter management table 1430 are stored into a storage resource (such as a memory 304). The configurations of the first filter management table 1410, the second filter management table 1420, and the third filter management table 1430 are equivalent to each other as shown in FIG. 12.

A plurality of filters is classified into a plurality of hierarchies. An n-th filter belongs to an n-th layer (n is a natural number). As n is smaller, a layer is on an upper level, and a filter belongs to a layer of an upper level. In the present embodiment, the plurality of hierarchies is composed of three hierarchies. A first filter belongs to a first layer (a layer 1), a second filter belongs to a second layer (a layer 2), and a third filter belongs to a third layer (a layer 3). At least one filter belongs to one layer. In the case in which a plurality of files and a plurality of storage apparatuses are concentrated to the hierarchies in the range of an upper level to a lower level in order of precedence, a file of a migration target and a storage apparatus of the migration destination are decided.

The first filter management table 1410 is provided with at least one first filter that belongs to the layer 1. More specifically, the first filter management table 1410 is provided with the information of a filter name 1411, a layer 1412, a file attribute 1413, a migration destination condition 1414, and an operation 1415 for each first filter. The information that is registered on one line (one record) of the first filter management table 1410 is the information that configures one first filter.

The filter name 1411 is a name of the first filter. In the example shown in FIG. 12, a capital letter of a name of a filter is "F" of an alphabet, and the subsequent numbers indicate a number of a layer to which the filter belongs.

The layer 1412 indicates a number of a layer to which the first filter belongs. Consequently, a value of the layer 1412 is "1".

The file attribute 1413 indicates a condition related to an attribute of a file of a migration target. A condition related to an access frequency (an I/O frequency) of a file is registered to the first filter management table 1410 as the file attribute 1413. A condition related to an attribute of another type of a file can also be registered as substitute for or in addition to the condition related to an access frequency (an I/O frequency) of a file.

The migration destination condition 1414 indicates a condition related to a storage apparatus of a migration destination. A condition related to an I/O performance is registered to the first filter management table 1410 as the migration destination condition 1414. A condition related to an attribute of another type for a storage apparatus can also be registered as substitute for or in addition to the condition related to an I/O performance.

The operation 1415 indicates a type of an operation (a processing) of at least one type that is executed to at least one of a migration source storage, a migration destination storage, and a migration target file during a migration. As a type of an operation, there is a migration source shredding (that means that the file information in a storage apparatus of a migration source is completely deleted. There is that not only the management information of a file system is modified as that "a file has been deleted" but also an area in which the data of a file has been stored is overwritten by 0 when a file of a migration source is deleted as one of methods). In addition, as a type of an operation, there are WORM ("WORM" is an abbreviation of Write Once Read Many), an encryption, a decryption, storing of a hash value, a compression, and a decompression for a file of a migration target.

A type of an attribute for a storage apparatus that is indicated by the migration destination condition 1414 that is included in the first filter (a filter that belongs to the highest level layer) can be equivalent to a type of an attribute for a storage apparatus that is indicated by the migration source condition 1203 of the trigger management table 1200.

The second filter management table 1420 is provided with at least one second filter that belongs to the layer 2. More specifically, the second filter management table 1420 is provided with the information of a filter name 1421, a layer 1422, a file attribute 1423, a migration destination condition 1424, and an operation 1425 for each second filter. The information of the filter name 1421, the layer 1422, the file attribute 1423, the migration destination condition 1424, and the operation 1425 is equivalent to the information of the filter name 1411, the layer 1412, the file attribute 1413, the migration destination condition 1414, and the operation 1415 in essence.

A condition related to an ACL of a file is registered to the second filter management table 1420 as the file attribute 1423. A condition related to an attribute of another type of a file can also be registered as substitute for or in addition to the condition related to an ACL of a file.

A condition related to the credibility as the migration destination condition 1424. A condition related to an attribute of another type of a storage apparatus can also be registered as substitute for or in addition to the condition related to the credibility.

The second filter management table 1420 can be provided with at least the following filters:

(x) a second filter that is provided with the file attribute 1423 that indicates a condition related to an ACL of a file that is provided with a low importance and the migration destination condition 1424 that indicates a condition that the credibility of a storage apparatus is low; and (y) a second filter that is provided with the file attribute 1423 that indicates a condition related to an ACL of a file that is provided with a high importance and the migration destination condition 1424 that indicates a condition that the credibility of a storage apparatus is high.

By the above configuration, it is expected that a file that is provided with a high importance is migrated to the private cloud storage 50 and a file that is provided with a low importance is migrated to the public cloud storage 60.

The third filter management table 1430 is provided with at least one third filter that belongs to the layer 3. More specifically, the third filter management table 1430 is provided with the information of a filter name 1431, a layer 1432, a file attribute 1433, a migration destination condition 1434, and an operation 1435 for each third filter. The information of the filter name 1431, the layer 1432, the file attribute 1433, the migration destination condition 1434, and the operation 1435 is equivalent to the information of the filter name 1411, the layer 1412, the file attribute 1413, the migration destination condition 1414, and the operation 1415 in essence.

The third filter management table 1430 is configured in such a manner that one migration destination is concentrated by using the third filter management table 1430. More specifically, there is one third filter that is included in the third filter management table 1430 for instance, the third filter is not provided with a condition as a file attribute 1433 in such a manner that at least two migration destinations that have been concentrated by using the second filter management table 1420 are concentrated to one migration destination, and the migration destination condition 1434 is a "lowest bit cost" (the condition for concentrating the migration destinations to one migration destination is not restricted to the condition that is shown in FIG. 12). However, it is not necessarily the case that one migration destination is concentrated by using the third filter management table 1430. In the case in which at least two migration destinations are specified by using the third filter management table 1430, the migration program 508 can select one migration destination from the at least two migration destinations in accordance with the prescribed rules and regulations or in a random manner.

Figure 13:
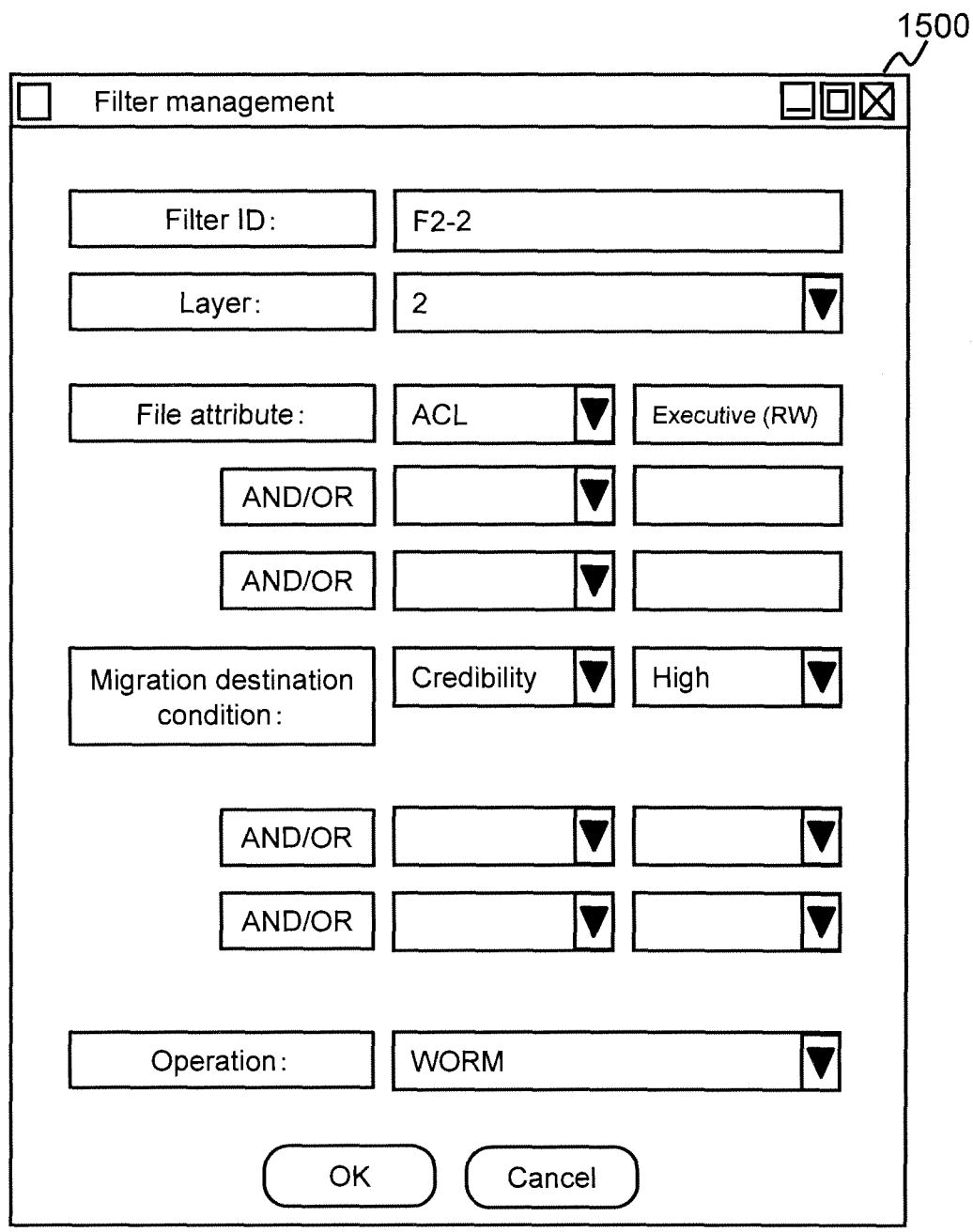
FIG. 13 shows a GUI 1500 that is indicated in the case in which a filter ID "F2-2" is selected and the "Edit" button is pressed in the GUI shown in FIG. 7.

The filter that is registered to the filter management tables 1410, 1420, and 1430 is the information that is input by a manager via the GUI 1500 shown in FIG. 13 and that is received from the management computer 70 for instance. The GUI 1500 shown in FIG. 13 is a GUI that is displayed in the case in which a filter ID "F2-2" is selected in the GUI 900 shown in FIG. 7 and the "Edit" button is pressed for instance. The manager can input the second filter of the filter ID "F2-2" via the GUI 1500, and the input filter is registered to the second filter management table 1420. The registered destination of the input filter can be specified by using a number next to "F" of an alphabet in the filter ID.

The filter can be registered by not only a GUI input but also a text input as shown in FIG. 14 for instance.

FIG. 15 shows a configuration of a migration post-processing management table 1700.

The migration post-processing management table 1700 is provided with the information related to a processing that is executed after a migration (a migration post processing). The migration post-processing management table 1700 is provided with the information of an ID 1701, a migration source storage 1702, a file attribute 1703, a migration destination storage 1704, and an operation 1705 for each migration post processing.

The ID 1701 is an ID of a migration post processing.

The migration source storage 1702 indicates a condition related to a storage apparatus of a migration source.

The file attribute 1703 indicates a condition related to an attribute of a file that has been migrated.

The migration destination storage 1704 indicates a condition related to a storage apparatus of a migration destination.

The operation 1705 indicates a type of an operation (a processing) of at least one type that is executed to at least one of a migration source storage, a migration destination storage, and a migration target file during a migration post processing. In the case where the combination of the migration source storage 1702, the file attribute 1703 and the migration destination storage 1704 is satisfied, the operation (a processing) indicated the operation 1705 corresponding to the combination is executed. In addition, asterisks (*) in FIGS. 12, 15 and 19 mean wildcard (what all kind of values are available).

Figure 16:
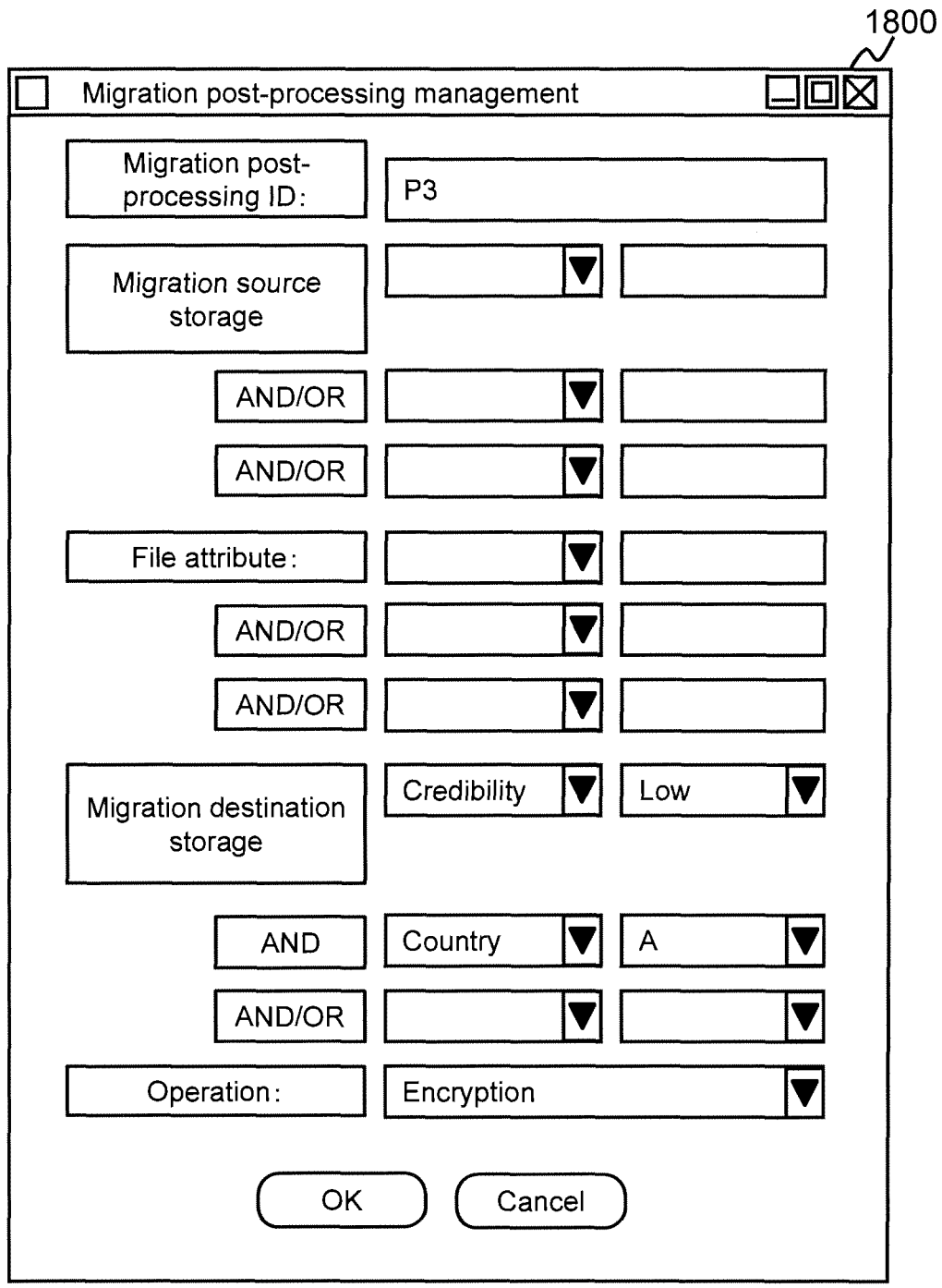
FIG. 16 shows a GUI 1800 that is indicated in the case in which an ID "P3" is selected and the "Edit" button is pressed in the GUI shown in FIG. 7.

The information that is registered to the migration post-processing management table 1700 is the information that is input by a manager via the GUI 1800 shown in FIG. 16 and that is received from the management computer 70 for instance. The GUI 1800 shown in FIG. 16 is a GUI that is displayed in the case in which an ID "P3" is selected in the GUI 900 shown in FIG. 7 and the "Edit" button is pressed for instance. The manager can input the information related to the migration post processing of the ID "P3" via the GUI 1800, and the input information is registered to the migration post-processing management table 1700.

The processing that is executed in the present embodiment will be described in the following.

The file sharing program 507 receives an access command from the client 10, and transmits the received access command to the hierarchical file system program 504.

The hierarchical file system program 504 receives an access command from the file sharing program 507, and specifies a stub that is specified by the access command. The hierarchical file system program 504 specifies a file to which the specified stub is linked, and controls a permission and inhibition of an access based on an affiliation of a user of the client 10 of a transmission source of an access command and the ACL 802 that is corresponded to the specified file (see FIG. 6). In the case in which the hierarchical file system program 504 accesses the specified file, the hierarchical file system program 504 updates the last access time 805 that is corresponded to the file (and the last update time 806).

In the case in which the hierarchical file system program 504 receives a write command as an access command and a stub of a target file of the write command does not exist in a hierarchical file system, the hierarchical file system program 504 executes the following processing:

(*) the hierarchical file system program 504 stores a file that accompanies with the write command into the local storage 40 regardless of an attribute of the file: and (*) the hierarchical file system program 504 stores a stub that is linked to the file into the hierarchical file system.

A file of a write target without a stub is referred to as a "new file". In the present embodiment, the storage destination of a new file is a local storage 40 for a dead certainty. The reason why the storage destination of a new file is the local storage 40 is that there is a high possibility that a new file is accessed again in a certain period of time as compared with a file that is not a new file and that the local storage 40 can be accessed at a faster pace as compared with the private cloud storage 50 and the public cloud storage 60.

As a modified example, it is not necessarily the case that the storage destination of a new file is a local storage 40. For instance, the hierarchical file system program 504 can also specify a migration destination storage that is indicated by a filter that conforms to of an ACL of a new file based on an ACL of a new file and a plurality of filters, and can store a new file into the specified migration destination storage.

In the present embodiment, the migration program 508 detects a trigger that conforms to any of the triggers 1202 that are indicated by the trigger management table 1200. In that case, the migration program 508 executes a migration processing (a subroutine processing).

As a trigger that conforms to any of the triggers 1202, there are the following triggers for instance:

(a) a trigger when a current time passes over a time that is indicated by the trigger 1202 (a periodic migration);

(b) a trigger when a file attribute (for instance, an ACL) is modified; and (c) a trigger when a free ratio of a specific storage apparatus (for instance, a local storage 40) exceeds a predetermined ratio.

A migration will be described in the following while a trigger (a) and a trigger (b) are examples.

<(a) Periodic Migration>

Figure 17:
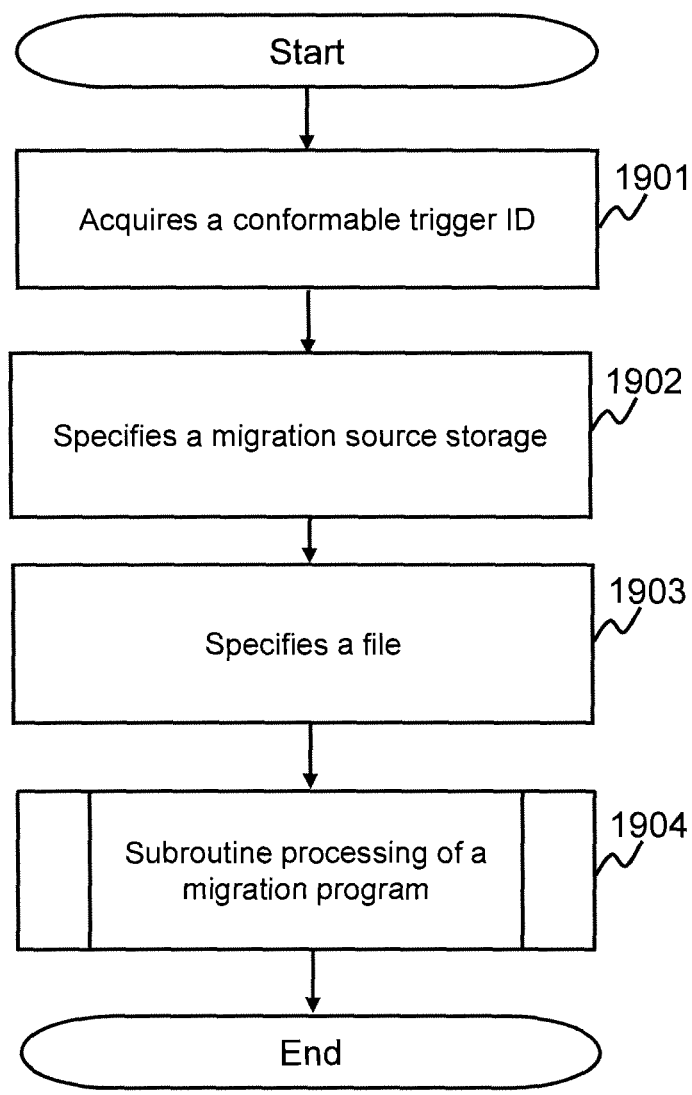
FIG. 17 shows a flowchart that indicates a total flow of a processing related to a periodic migration.

FIG. 17 shows a flowchart that indicates a total flow of a processing related to a periodic migration.

The migration program 508 specifies a trigger ID 1201 that is corresponded to the trigger 1202 that conforms to a current time from the trigger management table 1200 (STEP 1901). There is at least one trigger ID 1201 to be specified. One trigger ID 1201 (referred to as a "trigger ID 1201" in the description of FIG. 17) will be described as an example in the following. In the case in which there is not a trigger 1202 that indicates a time that conforms to a current time, the processing shown in FIG. 17 can be terminated.

In the next step, the migration program 508 specifies a storage apparatus that conforms to the migration source condition 1203 that is corresponded to the trigger ID 1201 from the storage management table 505 (STEP 1902). The storage apparatus that has been specified in the STEP is the migration source storage.

The migration program 508 specifies a file that conforms to a file attribute of a filter (a first filter) that is identified by the filter ID 1204 that is corresponded to the trigger ID 1201 from a plurality of files that have been stored into the migration source storage based on the file management table 503 (STEP 1903). The file that has been specified in the STEP is a candidate file of the migration target (hereafter referred to as a "file T" in the descriptions of FIG. 17 and FIG. 18).

In the next step, the migration program 508 executes a subroutine processing of the migration program 508 for the file T (STEP 1904).

Figure 18:
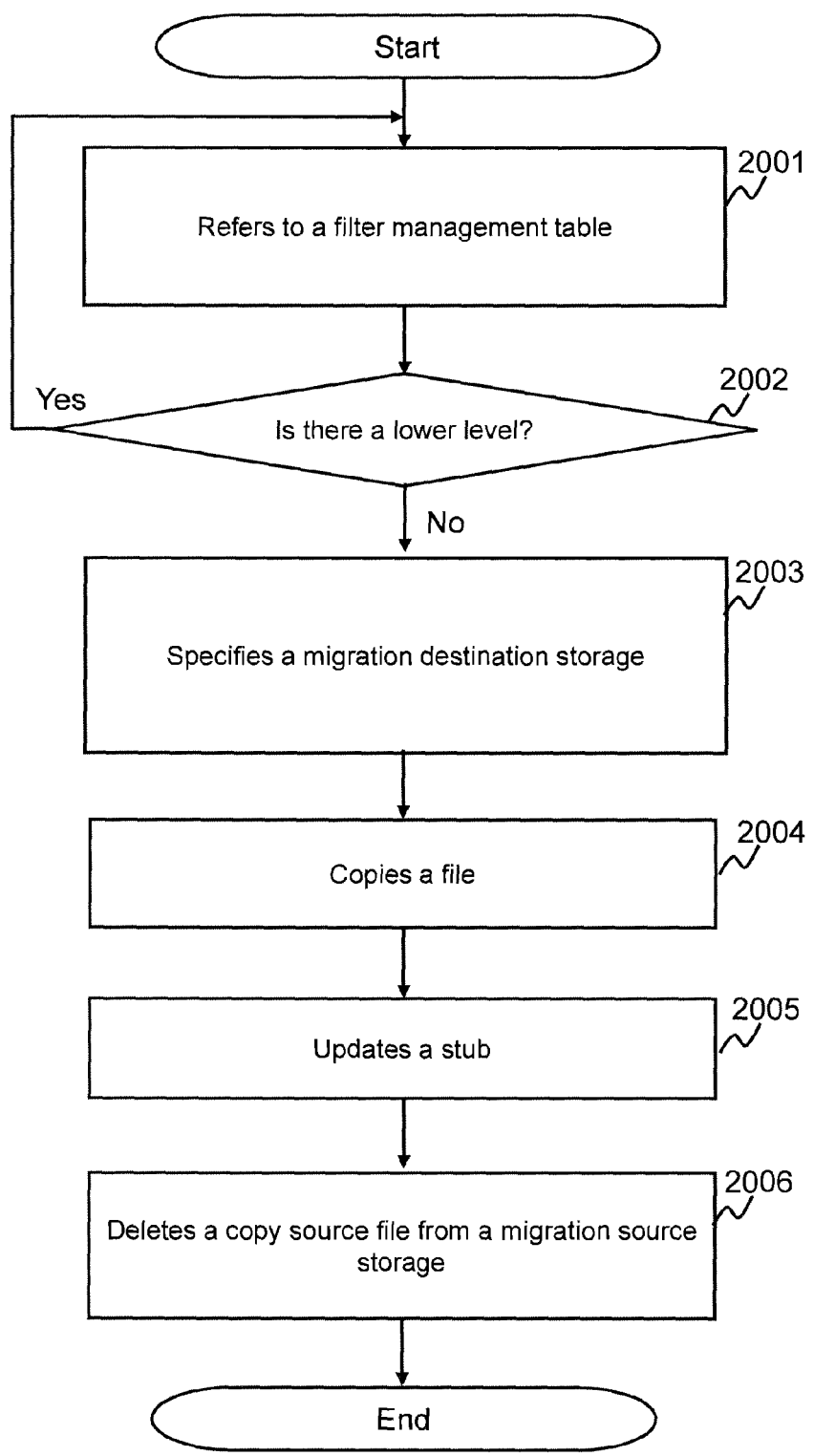
FIG. 18 shows a flowchart that indicates a flow of a sub-routine processing of a migration program.

FIG. 18 shows a flowchart that indicates a flow of a subroutine processing of the migration program 508.

The migration program 508 refers to a filter management table of the highest level among the filter management tables that are not referred to in the subroutine processing (excluding filter management tables that have been referred to in the STEP 1903). The migration program 508 then specifies a filter that includes a file attribute to which an attribute of the file T conforms in the filter management table (STEP 2001).

The migration program 508 judges whether or not there is a filter management table of the level lower than that of a filter management table that has been referred to in the latest STEP 2001 (STEP 2002).

In the case in which the result of the judgment of the STEP 2002 is positive (STEP 2002: YES), the STEP 2001 is executed again. In the STEP 2001, a filter management table of the highest level among the filter management tables of the level lower than that of a filter management table that has been referred to in the latest STEP 2001.

In other words, a filter that conforms to the file T is specified in the range of a filter management table of the higher level to a filter management table of the lower level in order of precedence by a repetition of the STEP 2001 and the STEP 2002. In the case in which a filter that conforms to the file T is not found, the migration program 508 can decide that the file T is not migrated.

In the case in which the result of the judgment of the STEP 2002 is negative (in other words, even a filter management table of the lowest level is referred to) (STEP 2002: NO), the migration program 508 specifies, from the storage management table 505, a storage apparatus that satisfies common elements (AND conditions) of all filters satisfying the file attributes of the file T (STEP 2003).

In the case in which a storage apparatus is not specified in the STEP 2003, the migration program 508 can decide that a migration of the file T is not executed.

In the STEP 2003, an operation (a processing) that complies with the information "operation" for at least two (or one) filters that have been specified for the file T can be executed to at least one of a migration source storage, a migration destination storage, and the file T. However, a processing of a shredding of a file of a migration target from a migration source storage is not executed. This is because a copy of a file of a migration target is not completed.

The migration program 508 then copies the file T from a migration source storage to a migration destination storage (STEP 2004).

The migration program 508 modifies the link destination information that has been stored into the stub that is linked to the file T to be the information that indicates a location of a copy destination (the information that indicates a location in a migration destination storage) (STEP 2005).

The migration program 508 deletes a migration target file (a copy source file in the STEP 2004) from a migration source storage (STEP 2006). Moreover, the migration program 508 searches a record that is provided with a migration source storage 1702, a migration destination storage 1704, and/or a file attribute 1703 that conform to at least one of (for instance, all of) an attribute of a migration source storage, an attribute of a migration destination storage, and an attribute of the file T from the migration post-processing management table 1700. In the case in which such a record is found, the migration program 508 executes an operation (a processing) that complies with the operation 1705 that is included in the record that has been found. As the operation (the processing), the migration program 508 executes a processing of a shredding of the file as a processing for deleting a migration target file (a copy source file in the STEP 2004) from a migration source storage.

<(b) Migration that is Accompanied with an ACL Modification>

Figure 20:
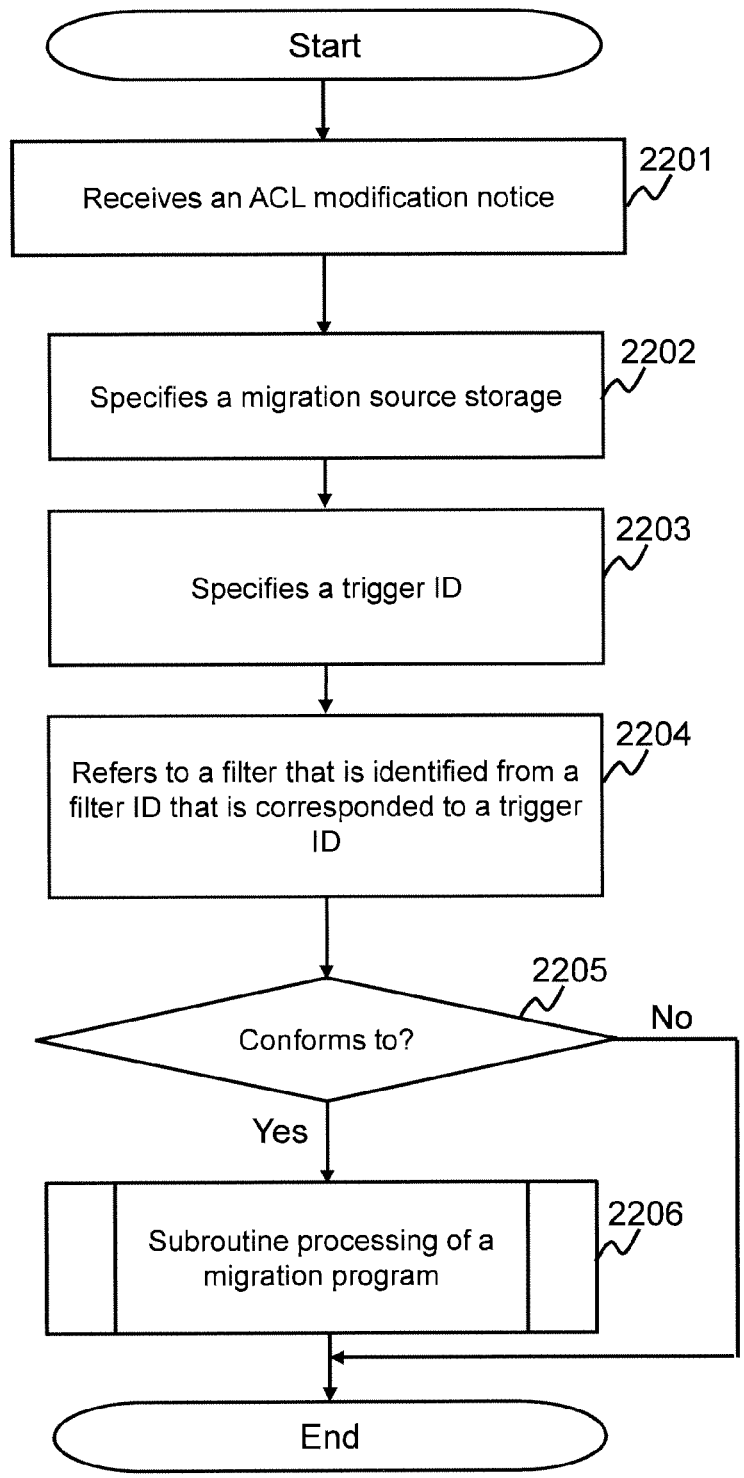
FIG. 20 shows a flowchart that indicates a total flow of a processing related to a migration that is accompanied with an ACL modification.

FIG. 20 shows a flowchart that indicates a total flow of a processing related to a migration that is accompanied with an ACL modification. A point that is different from a flow that is shown in FIG. 17 will be described in large part.

In the case in which an ACL of a file is modified, the hierarchical file system program 504 specifies a modification of an ACL and transmits a notice (an ACL modification notice) that includes the information that indicates a file in which an ACL has been modified (for instance, a file name or an ID) to the migration program 508. The migration program 508 receives the ACL modification notice (STEP 2201).

The migration program 508 specifies a file in which an ACL has been modified (hereafter referred to as a "file X" in the description of FIG. 20) from the ACL modification notice, and specifies a storage apparatus that stores the file from a stub of the file. The migration program 508 specifies an ID 1001 of the storage apparatus that has been specified from the storage management table 505 (STEP 2202).

The migration program 508 specifies a migration source condition 1203 in the trigger management table 1200 that conforms to any one of the storage attribute information 1003 to 1008 that are corresponded to the storage ID 1001 that has been specified (see FIG. 8), and specifies a trigger ID 1201 that is corresponded to the migration source condition 1203 (STEP 2203).

The migration program 508 identifies the first filter from the filter ID 1204 that is corresponded to the trigger ID 1201 that has been specified. The migration program 508 then judges whether or not an attribute of the file X (for instance, the last access time 805 and/or the last update time 806 that are corresponded to the file X) conforms to the file attribute 1413 that is included in the first filter (STEP 2204).

In the case in which the result of the judgment of the STEP 2204 is negative (STEP 2205: NO), the migration program 508 terminates a sequence of the processing that is shown in FIG. 20.

In the case in which the result of the judgment of the STEP 2204 is positive (STEP 2205: YES), the migration program 508 executes a subroutine processing of the migration program 508 for the file X (see FIG. 18) (STEP 2206).

In the present embodiment, a file that is corresponded to the ACL that conforms to the prescribed ACL condition is specified, and the specified file is migrated to a storage apparatus that conforms to the migration destination condition that is corresponded to the ACL condition. Consequently, a file that is provided with a high importance is migrated to a storage apparatus that is provided with a high credibility, and a file that is provided with a low importance is migrated to a storage apparatus that is provided with a low credibility.

Moreover, not only an ACL of a file and the credibility of a storage apparatus but also an access frequency of a file and the I/O performance of a storage apparatus are taken into consideration for a decision of a file of a migration target and a decision of a storage apparatus of a migration destination of a file. Consequently, a storage apparatus of a migration destination of a file is a storage apparatus that is suitable for both of an ACL and an access frequency of the file in a properly balanced manner. In the case in which a file that is provided with a high importance is stored in a storage apparatus for instance, when an access frequency of the file is a frequency that cannot be covered by the I/O performance of the storage apparatus, the file is migrated not to the storage apparatus but to a storage apparatus that is provided with a high I/O performance.

A condition related to an attribute of another type of a file such as a condition related to a size of a file and/or a content type can also be registered as substitute for or in addition to a condition related to at least one of an ACL and an access frequency of a file as a condition of an attribute of a file that is a migration target. Moreover, a condition related to at least one of a bit cost (a unit cost per unit size), a storage country, a storage location, and a connection method can also be registered as substitute for or in addition to a condition related to at least one of the I/O performance and the credibility as a condition of an attribute of the migration source storage and/ or a condition of an attribute of the migration destination storage. In the present embodiment, a plurality of filters that are provided with different hierarchies are prepared, and a combination of a file attribute condition and a migration destination storage condition that are stored into one filter is different from each other for each layer. A file of a migration target and the migration destination storage of the file can be decided based on a plurality of filters that are provided with different hierarchies. Consequently, it is expected that a file that satisfies the file attribute conditions of a plurality of types can be migrated to a storage apparatus that are suitable for the file attribute conditions of the plurality of types.

While the preferred embodiments in accordance with the present invention have been described above, the preferred embodiments are examples for explaining the present invention, the scope of the present invention is not restricted to the preferred embodiments, and various changes, modifications, and functional additions can be thus made without departing from the scope of the present invention.

For instance, an encryption system that is required is different depending on a country. Consequently, in the case in which the operation 1415, 1425, or 1435 that is included in a filter represents "an encryption", the migration program 508 can specify an encryption system that is corresponded to a country in which a storage apparatus of a migration destination is mounted (a country that is specified by the storage country 1006 that is corresponded to the storage apparatus), and executes an encryption of a file of a migration target according to the specified encryption system.

REFERENCE SIGNS LIST

10: Client
30: File server
40, 50, and 60: Storage apparatuses
70: Management computer

The invention claimed is:

1. A system comprising:
 a file server managing a plurality of files, the file server including a CPU and a memory;
 a local storage device coupled to the file server, the local storage storing at least some of the files;
 a plurality of first file storage systems coupled to the file server, each of which including a first file server and a first storage device; and
 a plurality of second file storage systems coupled to the file server, each of which including a second file server and a second storage device,
 wherein the memory stores:
 file management information including, for each of files, access control information and last access time, and
 storage management information including, for each of the first and the second file storage systems, its I/O performance and information indicating whether high or low of its credibility determined by its difficulty for a leak of information and a falsification of information, wherein a high credibility has a greater credibility than a low credibility,
 wherein the credibility information of the first file storage systems is high and the credibility information of the second file storage systems is low,
 wherein the file server is configured to:
 determine one of the files to migrate in accordance with both I/O performance of the local storage device and access status to the files, and
 when importance of the file to migrate is high which is determined by the access control list of the file, select one of the first file storage systems as a migration destination, and otherwise, select one of the second file storage systems as the migration destination, wherein a file with high importance has a greater importance than a file with low importance,
 wherein the one of the first or the second file storage systems as a migration destination is selected further based on the access status of the each of the files to be migrated and the I/O performance of the one of the first or the second file storage systems.

2. The system according to claim 1,
 wherein the storage management information further includes, for each of the first and the second file storage systems, information on its bit cost,
 wherein the bit cost of the selected one of the first or the second file storage systems is the lowest of the first or the second file storage systems.

3. A method of a system which comprises a file server managing a plurality of files, the file server including a CPU and a memory, a local storage device coupled to the file server, the local storage storing at least some of the files, a plurality of first file storage systems coupled to the file server, each of which including a first file server and a first storage device, and a plurality of second file storage systems coupled to the file server, each of which including a second file server and a second storage device, the method comprising:
 storing, in the memory, file management information including, for each of files, access control information and last access time;
 storing, in the memory, storage management information including, for each of the first and the second file storage systems, its I/O performance and information indicating whether high or low of its credibility determined by its difficulty for a leak of information and a falsification of information, wherein a high credibility has a greater credibility than a low credibility, wherein the credibility information of the first file storage systems is high and the credibility information of the second file storage systems is low,
 determining, by the file server, one of the files to migrate in accordance with both I/O performance of the local storage device and access status to the files;
 selecting, by the file server, one of the first file storage systems as a migration destination, when importance of the file to migrate is high, which is determined by the access control list of the file; and
 selecting, by the file server, one of the second file storage systems as the migration destination, when importance of the file to migrate is not high,
 wherein a file with high importance has a greater importance than a file with low importance, wherein the one of the first or the second file storage systems as a migration destination is selected further based on the access status of the each of the files to be migrated and the I/O performance of the one of the first or the second file storage systems.

4. The method according to claim 3,
wherein the storage management information further includes, for each of the first and the second file storage systems, information on its bit cost,
wherein the bit cost of the selected one of the first or the second file storage systems is the lowest of the first or the second file storage systems.

\* \* \* \* \*